(12) United States Patent
Khoo et al.

(10) Patent No.: US 7,593,372 B2
(45) Date of Patent: Sep. 22, 2009

(54) METHOD AND RADIO DEVICE FOR SCANNING A WIRELESS COMMUNICATIONS CHANNEL

(75) Inventors: Hun Weng Khoo, Penang (MY); Darrell Stogner, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 454 days.

(21) Appl. No.: 11/620,351

(22) Filed: Jan. 5, 2007

(65) Prior Publication Data
US 2008/0165759 A1 Jul. 10, 2008

(51) Int. Cl.
H04B 3/00 (2006.01)
(52) U.S. Cl. .................. 370/336; 370/350; 370/503
(58) Field of Classification Search .............. 370/347, 370/327, 336, 350, 503; 455/161.1
See application file for complete search history.

(56) References Cited

U.S. PATENT DOCUMENTS

| | | | | |
|---|---|---|---|---|
| 5,594,776 A | * | 1/1997 | Dent | 455/458 |
| 5,864,752 A | * | 1/1999 | Pinder | 455/161.3 |
| 6,480,709 B2 | * | 11/2002 | Phang et al. | 455/260 |
| 6,788,924 B1 | * | 9/2004 | Knutson et al. | 455/265 |
| 6,807,163 B1 | * | 10/2004 | Shi | 370/337 |
| 7,369,869 B2 | * | 5/2008 | Wiatrowski et al. | 455/518 |
| 2005/0288015 A1 | * | 12/2005 | Azizi et al. | 455/434 |
| 2006/0215627 A1 | * | 9/2006 | Waxman | 370/347 |
| 2006/0274714 A1 | * | 12/2006 | Chowdhary et al. | 370/347 |

* cited by examiner

*Primary Examiner*—Kent Chang
*Assistant Examiner*—Magdi Elhag
(74) *Attorney, Agent, or Firm*—Terri S. Hughes (57) ABSTRACT

The present invention switches from the TDMA non-scan channel to an RF carrier signal frequency of the scan channel. If the scan channel is unmarked, performing an inspection of activity on the scan channel in order to determine whether activity on the scan channel is addressed to the radio device, and marking the scan channel when activity on the scan channel is not addressed to the radio device. Determining whether the scan channel is active in response to determining that the scan channel is marked, unmarking the scan channel in response to determining that the scan channel is not active, and switching to the RF carrier signal of the TDMA non-scan channel, wherein the timing of the switching between the RF carrier signal frequency of the scan channel and the RF carrier signal of the non-scan channel is dependent on the timing of the designated slots of the non-scan channel.

15 Claims, 5 Drawing Sheets

METHOD AND RADIO DEVICE FOR SCANNING A WIRELESS COMMUNICATIONS CHANNEL

TECHNICAL FIELD

This invention relates in general to wireless communications systems and more specifically to scanning a priority channel in a two-way radio system.

BACKGROUND

In a two-way radio communications system, a set of mobile stations (MS) communicate with each other and/or a set of base stations. The MS may communicate with each other in "direct mode" in which simplex transmissions between two MS are carried out directly over a shared channel. Where the two MS, or an MS and a base station, are too far apart in order to communicate effectively over a shared direct mode channel, an intermediate station acts as a repeater by receiving and then re-transmitting the communications between the two end point MS on different channels. Traditionally, both the direct mode and repeater channels have been implemented using analog or digital frequency division multiple access (FDMA) two-way radio communications systems in which a single radio frequency (RF) carrier is allocated to each channel. Recently, the use of time division multiple access (TDMA) communication systems have been proposed for use in two-way radio communications systems, and in which a single RF carrier signal or medium is divided into time slots to carry a number of different channels.

Because the communication system carries many communications at one time, a MS may want to monitor other communications in the system. Scan is a feature that allows a MS to monitor other communications in the system. During a scan, a MS locks on to a specific RF carrier signal and inspects activity that may be present on the carrier signal. In a TDMA communications system, the MS must inspect activity on designated slots of the RF carrier frequency which are associated with the channel being scanned.

A priority scan involves scanning a higher priority channel whilst engaged in activity (e.g., a voice call) on a lower priority channel. The scan aims to determine whether any activity on the scanned channel is of interest, for example, whether a call on the scanned channel is addressed to the scanning MS. The scan involves switching away from the RF carrier signal of the active or in-use channel, on which the MS may be receiving a call, and switching to the RF carrier signal of the scan channel. This time away from the call that the MS is engaged in on the active channel results in the MS missing some of the active channel call resulting in an "audio hole". If the scanned channel is carrying a communication that is not addressed to the MS or the scanned channel has no communications at all, then the MS returns to the call that it was previously engaged in and listening to on the active channel.

In order to reduce the size of the audio hole, the MS records whether the last time the MS performed a scan of the scan channel, that a communication on this scan channel was not addressed to the MS. Thus, the next time that the MS performs a scan and listens to the same scan channel, if the RF carrier signal associated with the scan channel is present, then the MS assumes that the activity or call on the scan channel is the same continuing communication which is addressed to the MS and quickly returns to the call that it is listening to on the active channel. This assumption that current RF carrier signal activity is a continuation of the RF carrier signal activity on the last scan enables the MS to reduce the size of the audio hole on the current scan.

However, while this assumption is practical for an analog or digital FDMA scan channel, it is not a good assumption for TDMA systems, since the fact that a RF carrier signal associated with the scan channel is present may be attributed to a new call (that may be addressed to the MS) in a different time slot as opposed to the same call (that is not addressed to the MS) in the same time slot. Thus, to determine whether the presence of the RF carrier associated with the scan channel is of a new call or the same call, the MS needs to synchronize and decode the RF carrier signal to determine whether the RF carrier signal is carrying a communication that is of interest to the MS. This results in a longer scan time for TDMA scan channels, and therefore causes the "audio hole" problem to be compounded in TDMA systems.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PRESENT INVENTION

Briefly, in accordance with the present invention, there is disclosed herein a radio device and method for scanning a scan channel during activity on a TDMA non-scan channel. Where the scan channel is marked as having been previously inspected and found not to be of interest to the radio device (i.e., not addressed to the radio device), a shortened scan procedure may be carried out. The scan channel may have been marked, for example, when an inspection of activity on the scan channel has revealed that this activity, such as a control signal or a data or voice call, was not addressed to the radio device, and therefore was of no interest. The scan channel will be unmarked if it has not yet been inspected, or if previous activity of no interest to the radio device has finished, or if the scan channel has no previous RF carrier signal, so that any future activity may or may not be of interest to the radio device and hence will require inspection. When the scan channel is unmarked, an inspection of the scan channel is carried out by the radio device in order to determine whether any activity on the scan channel is of interest to the radio device; for example there is a new voice call being broadcast to a call group and the radio device is a member of that call group.

If the scan channel is marked, then a reduced duration sampling of the scan channel can be performed in order to determine whether the previous activity, which was determined as of no interest, is now still continuing or has finished. This reduced sampling time of the scan channel reduces the corresponding audio hole in the TDMA non-scan channel. If the previous activity has finished, then the channel can be unmarked, however, if activity is still detected, then it is assumed to be the same continuing activity of no interest and the scan channel remains marked.

In one embodiment, the sampling of the scan channel is timed dependent on the designated slot timings of the TDMA non-scan channel. For example, the sampling period may be arranged to start immediately following the end of a designated slot for the TDMA non-scan channel. Where the scan channel is analog, it is sufficient to detect that a carrier signal is present on the RF carrier frequency of the scan channel in order to determine that activity is present on the scan channel. This can be carried out quickly and typically in less time than one slot duration of the TDMA non-scan channel. Thus, by timing the switch to the RF carrier signal frequency associated with the scan channel to coincide with a slot not associated with the TDMA non-scan channel, the radio device does not miss receiving any of the designated slots associated with the TDMA non-scan channel. This means that there will be no audio hole in this case. For example, when the TDMA non-scan channel is part of a two-slot TDMA communications system, the scan may be timed to coincide with the "off" slot, which is the slot that is not the designated slot of the TDMA non-scan channel. Should more time be required than is available during an "off" slot, then the number of TDMA non-scan channel designated slots impacted, and hence the size of the audio hole, can be minimized by arranging the start and end of the sample period (or the switching time to switch to the RF carrier signal frequency of the scan channel and back to the RF carrier signal of the TDMA non-scan channel) to not coincide with designated slots of the TDMA non-scan channel. For example, switching to the RF carrier signal frequency of the scan channel (start of scan channel sample) can be performed at the end of a designated slot of the TDMA non-scan channel. Similarly, switching back to the RF carrier signal of the TDMA non-scan channel can be performed before the start of a subsequent TDMA non-scan channel designated slot.

In one embodiment, slightly more than two slot periods or one frame period may be required in order to determine whether there is still activity present on a marked TDMA scan channel. With appropriate timing of the scan channel sampling, only one TDMA non-scan channel designated slot needs to be impacted. For example, the scan channel sampling can begin immediately following the end of a TDMA non-scan channel designated slot, or at least not coinciding with a TDMA non-scan channel designated slot. The radio device can then switch back to the TDMA non-scan channel one frame later in order to start receiving the next TDMA non-scan channel designated slot in the subsequent frame, thus missing only one designated slot of the TDMA non-scan channel during the TDMA scan channel sampling or scanning frame.

In an embodiment, activity on a TDMA scan channel is determined by recovering an activity identifier in a control slot associated with a TDMA scan channel designated slot. In order to recover this activity identifier, a synchronization message is first detected in any of the TDMA scan channel slots in order to identify the location within the sample of the activity identifier. In the ETSI TS 102 361-1 protocol, the activity identifier is one of the TACT bits within the CACH control slot associated with the TDMA scan channel designated slot. However, in this protocol, a synchronization message is not always present when both the slots are active with voice calls on the scan channel, and if this is the case, it is assumed that the previous activity of no interest is continuing, and so the scan channel remains marked.

Before describing in detail a particular method and radio device for scanning a scan channel in accordance with one or more embodiments of the present invention, it should be observed that the present invention resides primarily in combinations of method steps and receiver components related to a method and a device for scanning a scan channel. Accordingly, the circuit components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

A "set" as used in this document, means a non-empty set (i.e., comprising at least one member). The term "another", as used herein, is defined as at least a second or more. The terms "including" and/or "having", as used herein, are defined as comprising.

It is further understood that the use of relational terms, if any, such as first and second, top and bottom, and the like, are used solely to distinguish one entity or action from another, without necessarily requiring or implying any actual relationship or order between such entities or actions.

Figure 1:
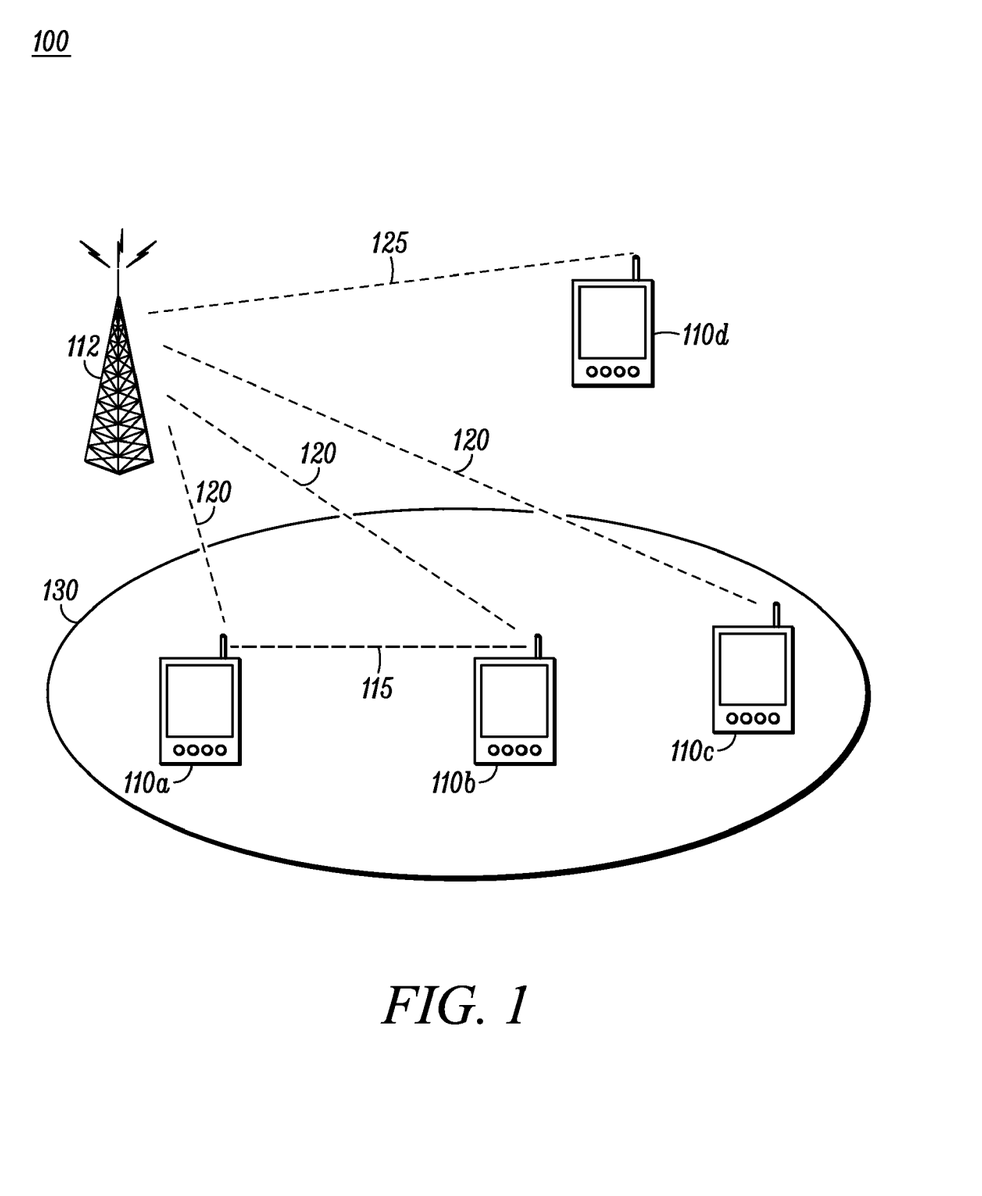
FIG. 1 is a schematic diagram illustrating a communications system according to an embodiment of the present invention.

FIG. 1 is a schematic illustrating a two-way radio communications system 100 comprising a number of radio devices 110. One of the radio devices 110a has formed a connection 115 with a neighboring radio device 110b using a direct mode channel. The direct mode channel may be an analog channel, a digital FDMA channel, for example, according to the Association of Public-Safety Communications Officials-International (APCO) protocol, or a TDMA channel, for example, as defined in the ETSI TS 102 361-1 protocol (referred to herein as "F2"). The F2 protocol is a two-slot TDMA protocol in which each one of a number of RF carrier signal has two slots and hence two channels. Various direct mode connections 115 may be formed between neighboring radio devices 110, each using a different RF carrier signal. The radio devices 110 may also communicate with radio repeater devices 112 which relay communications between radio devices which are too distant from each other to communicate directly with each other using direct mode channel connections 115. Radio device 112 is acting as a repeater between radio device 110d on connection 125 and the radio devices 110a, 110b, 110c of a talk group 130. A number of connections 120 can be formed between the repeater radio device 112 and the radio devices 110a, 110b, 110c of the talk group 130 using a repeater mode channel.

In the two-way radio communications system 100, one of the channels may be designated as priority channel, for example, for emergency calls. When communicating over a non-priority channel, a radio device 110 is arranged to periodically scan the priority channel in order to check whether any emergency calls being carried on the priority channel are addressed to the radio device. This scanning procedure causes the radio device to switch away from the non-priority channel whilst scanning the priority channel, resulting in missed data and hence an audio hole during a voice call.

Figure 5:
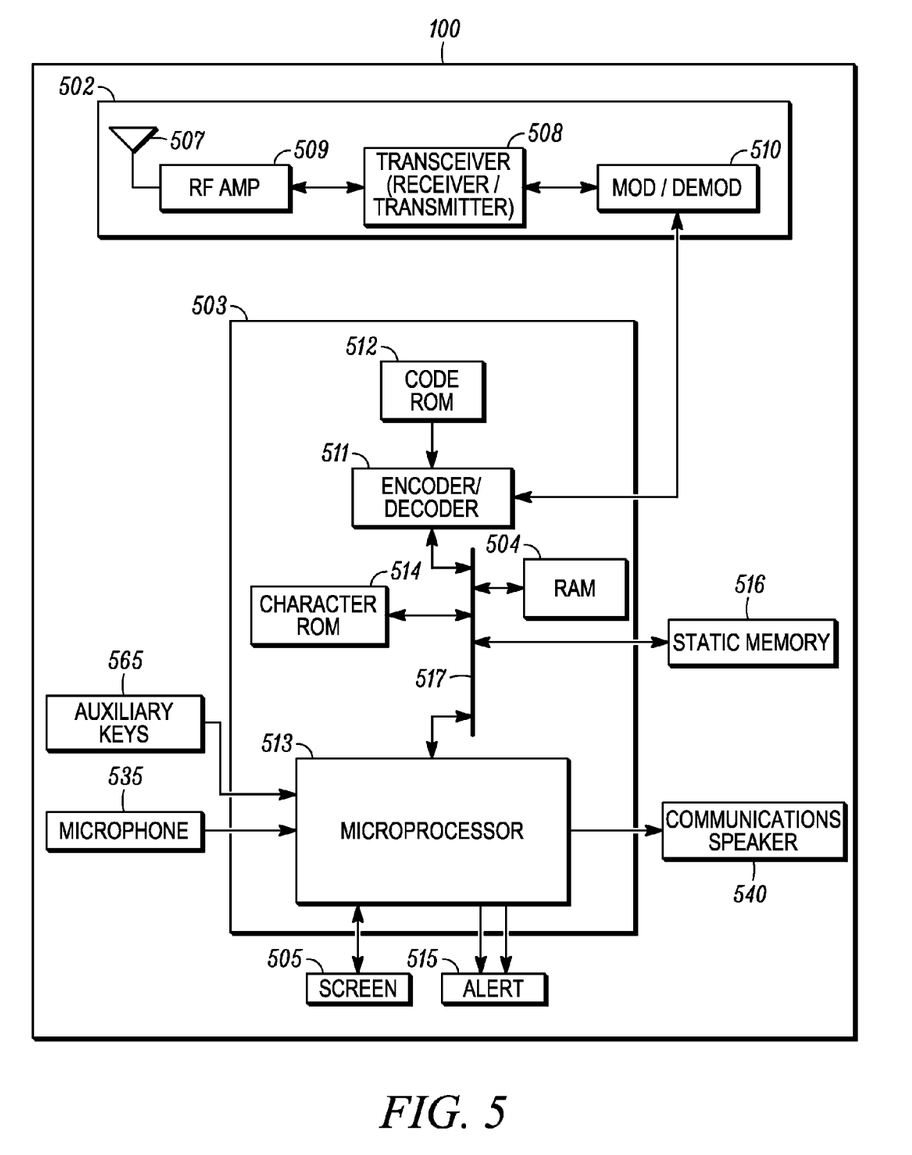
FIG. 5 is a schematic block diagram illustrating circuitry of a radio device in accordance with the present invention.

FIG. 5 illustrates a radio device according to an embodiment in more detail. The radio device 100, typically a two-way radio or "walkie-talkie" type of wireless communications device, comprises a radio frequency communications unit 502 coupled to be in communication with a processor 503. The radio device 500 also has a screen that can be a touch screen 505 and a full keypad or auxiliary keys 565. There is also an alert module 515 that typically contains an alert speaker, vibrator motor and associated drivers. The touch screen 505, auxiliary keys 565 and alert module 515 are coupled to be in communication with the processor 503. The processor 503 includes an encoder/decoder 511 with an associated code read only memory (ROM) 512 for storing data for encoding and decoding voice or other signals that may be transmitted or received by the electronic device 500. The processor 503 also includes a micro-processor 513 coupled, by a common data and address bus 517, to the encoder/decoder 511, a character ROM 514, a random access memory (RAM) 504, and static or non-volatile programmable memory 516.

The microprocessor 513 has ports for coupling to the touch screen 505, the auxiliary keys and the alert module 515. Also, microprocessor 513 has ports for coupling to a microphone 535 and a communications speaker 540 that are integral with the device. The character ROM 514 stores code for decoding signals received by the radio device 502. In this embodiment, the character ROM 514 and static memory 516 may also store operating code (OC) for the microprocessor 513 and code for performing functions associated with the radio device.

The radio frequency communications unit 102 is a combined receiver and transmitter unit having a common antenna 507. The communications unit 502 has a receiver and transmitter (transceiver) 508 coupled to the antenna 507 via a RF amplifier 509. The transceiver 508 is also coupled to a combined modulator/demodulator 510 that couples the communications unit 502 to the processor 503. The receiver is arranged to receive TDMA channels in respective RF carrier signals carrying periodic frames of a plurality of slots, the slots carrying respective TDMA channels. An example TDMA protocol for use in an embodiment is the ETSI TS 102 361-1 or F2 protocol. The receiver may also be arranged to receive an analog channel, for example, a frequency modulated RF carrier signal.

Figure 2:
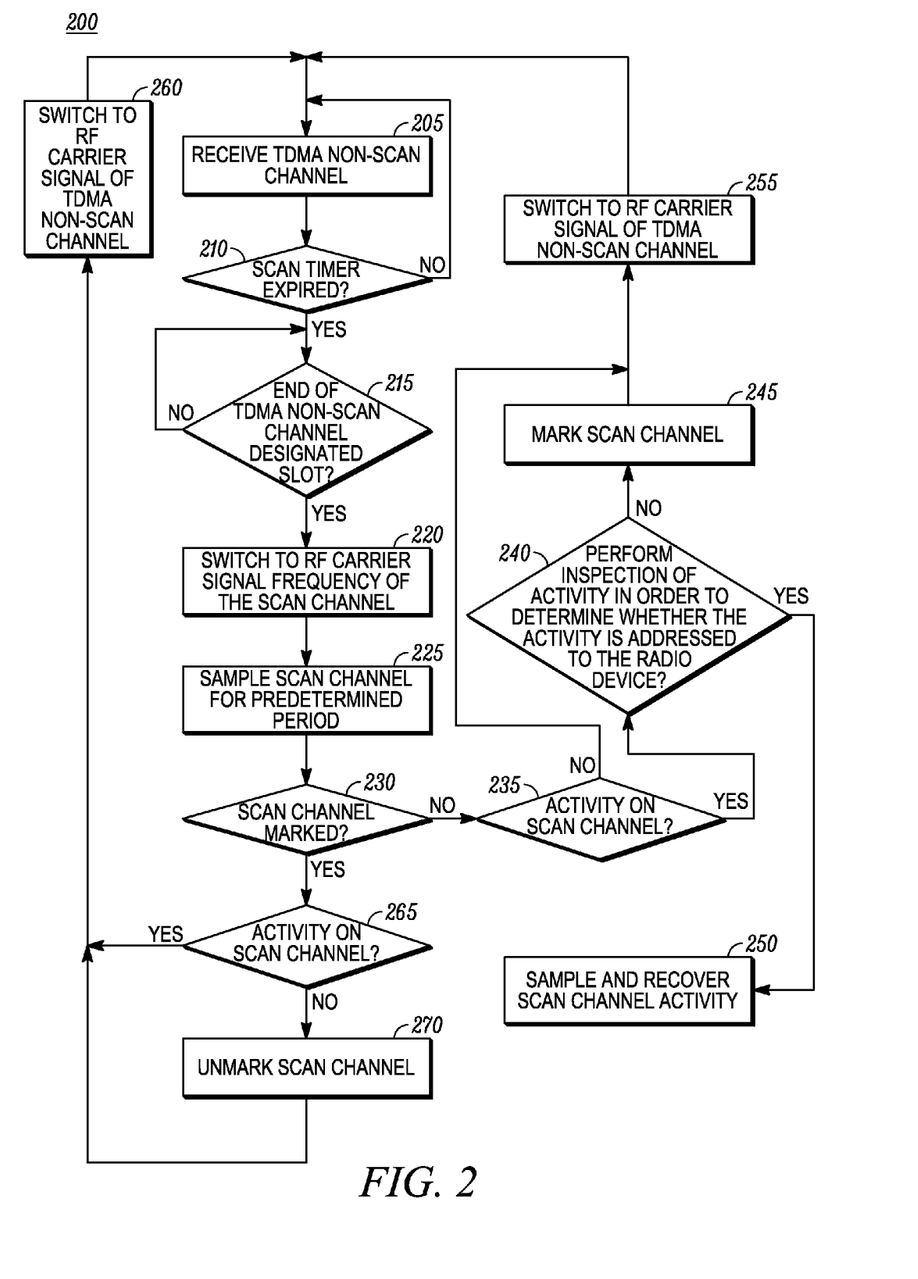
FIG. 2 is a flow chart illustrating a method of scanning a scan channel according to an embodiment of the present invention.

FIG. 2 illustrates a method of scanning a scan or priority channel during activity on or use of a non-scan or non-priority channel. Whilst the scanning typically takes place in relation to a higher priority channel than the active or in-use channel on which the device is receiving a communication, this need not always be the case, and therefore in the embodiment the term scan channel is used to refer to the channel that is not currently active but needs to be monitored—typically the priority channel; and the term non-scan channel refers to the currently active or in-use channel—typically the non-priority channel. The embodiment of FIG. 2 also relates to the case where the non-scan channel is a TDMA channel, for example, an F2 channel. The scan channel may be another TDMA channel, an analog channel, a digital FDMA channel, or any other non-TDMA channel.

The method 200 initially receives a TDMA non-scan channel at step 205, for example, an F2 direct mode channel 115. The method periodically scans a scan channel, such as a priority channel or connection 120 in a two-way radio communications system 100, upon expiration of a scan timer at step 210. The duration of the scan timer will be configurable depending on system requirements as is known (e.g., 2 seconds), and reset after each expiration. At step 215, the method waits until the end of a TDMA non-scan channel designated slot before switching to the RF carrier signal frequency of the scan channel at step 220 as described in more detail below.

Figure 3:
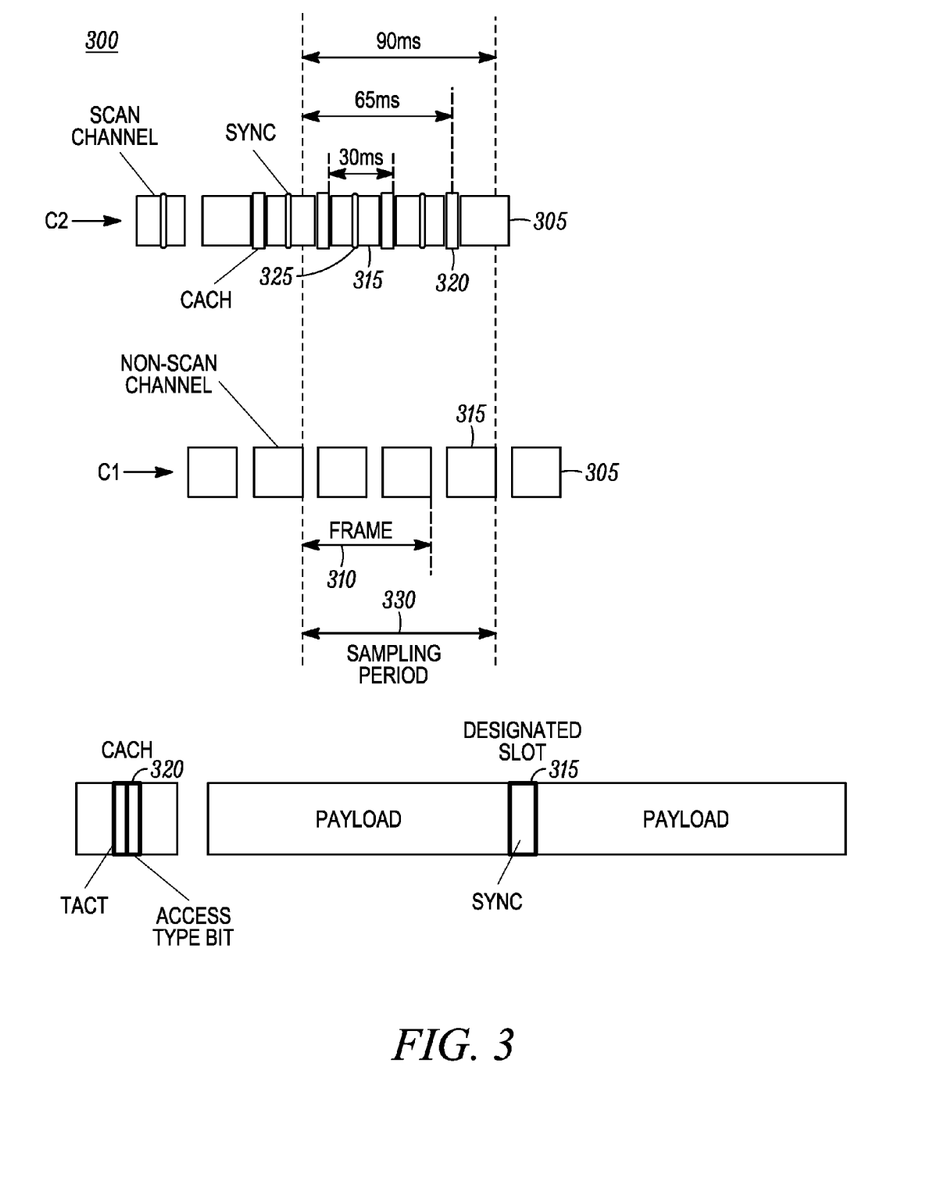
FIG. 3 is a schematic diagram illustrating the sample timing of a TDMA scan channel and a TDMA non-scan channel according to an embodiment of the present invention.

FIG. 3 illustrates the slot structure of F2 based TDMA channels. An F2 system comprises a number of RF carrier signals 305, each having periodic or repeating frames 310 of two slots 315. Each slot 315 within a frame 310 corresponds to a channel of the F2 system. In direct mode, one carrier signal C1 is reserved for use of that one direct mode channel, so that only one slot 315 is used. Each slot 310 or burst is 30 ms in duration, and a frame is 60 ms in duration including two slots 310 and a guard interval (gap) or a control slot 320. The control slot is called the common announcement channel (CACH) and is only used in repeater mode. In repeater mode, one RF carrier signal C2 may be used to support up to two repeater channels, one for each slot 310. Each repeater channel slot 310 (C2) has an associated CACH 315 preceding it in the RF carrier signal C2, and typically a SYNC message or pattern 325 embedded within the slot 310. The SYNC message 325 is present when there is no activity (e.g., no voice or data call) on the repeater channel designated slot 310. There is also a SYNC message 325 present when a data call is in progress on the repeater channel, but there is only a SYNC message 325 every sixth designated slot 310 when a voice call is in progress on the repeater channel. Each CACH 320 includes TDMA Access Channel Type (TACT) bits which indicate whether the repeater channel is active or idle, for example whether the associated slots are carrying voice or data calls, or no activity.

Referring now also to FIG. 2, the step 215 of determining whether a TDMA non-scan channel designated slot (310 in C1) has finished can be implemented in an F2 embodiment by monitoring the RF carrier signal (C1) of the active or non-scan channel which is indicated in FIG. 3 by the shaded designated slot 310. Following expiry of the scan timer at step 210, the time at which the next non-scan channel designated slot 310 (shaded) ends is determined at step 215. This may be implemented using a frame synchronization signal or timer as will be appreciated by those skilled in the art. The radio device then switches to the RF carrier frequency of the scan channel at step 220. Where the scan channel is a F2 repeater mode channel, this may correspond to the carrier signal C2 and in which the scan channel is associated with the unshaded designated slots 310. The scanning method 200 then samples the RF carrier signal frequency of the scan channel for a predetermined time or sampling period at step 225. The predetermined period for a F2 repeater mode scan channel is 90 ms in this embodiment, though it may be slightly more than one frame (65 ms). Similarly, in other TDMA based systems, sampling the RF carrier signal frequency for a single frame may be sufficient in order to detect activity on the designated slot 310 of the scan channel.

The method then determines whether the scan channel is marked at step 230. Marking of the scan channel indicates that the scan channel has recently been scanned and/or inspected and activity on the scan channel was determined to be of no interest to the radio device; for example the call corresponding to the activity was not addressed to the radio device. If the channel is unmarked (230N), this indicates that on the last scan (or at start up) there was no activity on the scan channel. In this case (230N), the method performs an inspection of activity on the scan channel in order to determine whether activity on the scan channel is addressed to the radio device. First, the method determines whether the scan channel is active at step 235. If the scan channel is not active (235N), then the method switches back to the RF carrier signal of the TDMA non-scan channel at step 255. The method then returns to receive the TDMA non-scan channel at step 205. If the scan channel is a non-TDMA scan channel, for example, an analog channel, then no activity on the scan channel can be determined by the lack of a carrier signal or activity on the RF carrier signal frequency of the scan channel. If the scan channel is a TDMA channel, for example, a F2 repeater channel, then determination of activity on the channel may be more complicated and will be described in more detail below.

If the scan channel is active (235Y), for example, it is carrying a voice or data call, then a full inspection of activity is performed at step 240 in order to determine whether the activity is addressed to the radio device at step 240. This involves decoding the communications, as will be appreciated by those skilled in the art, in order to determine one or more radio device addresses or identifiers to which the call or activity is addressed. If the activity on the scan channel is not addressed to the radio device (240N) which is performing the scanning method 200, then the scan channel is marked at step 245. The method then switches back to the RF carrier signal of the TDMA non-scan channel at step 255, and returns to receive the TDMA non-scan channel at step 205. However, if the activity on the scan channel is addressed to the radio device (240Y), then the method switches to receive and recover that activity, for example, a voice call, on the scan channel at step 250.

If, however, the scan channel is already marked (230Y) at step 230, the method determines whether the scan channel is active at step 265. For an analog or FDMA scan channel, this merely involves determining whether or not a carrier signal is present on the RF carrier signal frequency of the scan channel. Similarly, for a F2 direct mode scan channel in which only one slot is used, the presence of a carrier signal indicates activity on the corresponding designated slots as the other off slots are unused. For a F2 repeater mode scan channel or other TDMA based scan channels in which the scan channel may maintain some control or synchronization activity even when there is no traffic (e.g., voice or data call) activity present and/or other slots on the same carrier signal may or may not be active, it is necessary to inspect activity on the channel more deeply. In F2 repeater mode, a channel maintains a SYNC message 325 and CACH 320 even when the channel is idle. In order to determine whether the channel is active or idle, the TACT bits of the CACH slot 320 must be inspected.

If the scan channel is still active (265Y), the method switches back to the RF carrier signal of the TDMA non-scan channel at step 260, so that the radio device is only away from the RF carrier of the TDMA non-scan channel for the predetermined period of the sample at step 255. The method then returns to receive the TDMA non-scan channel at step 205. This indicates that previously inspected activity on the scan channel which was of no interest to the radio device (i.e., not addressed to the radio device) is continuing, and so there is no need to fully inspect the activity on the next scan—the next scan need only determine whether the activity is still continuing or has ended. If the scan channel is no longer active (265N), then the scan channel is unmarked at step 270. This indicates that previously inspected activity on the scan channel which was of no interest to the radio device has finished or ended. In this case, it will be necessary to inspect any subsequent activity in order to determine whether this new activity is of interest to (i.e., addressed to) the radio device; or whether this new activity is not of interest to the radio device, in which case the scan channel will again be marked (245). Following unmarking of the scan channel (270), the method switches back to the RF carrier signal of the TDMA non-scan channel at step 260. The method then returns to receive the TDMA non-scan channel at step 205. Although not shown, the scan channel may also be unmarked following a predetermined duration even when active. This can be used to determine when the activity on the scan channel has changed between scans, for example, uninteresting activity has finished and interesting activity has started. This would not normally be detected by the periodic scans.

Because the scan is timed to start immediately following the end of a TDMA non-scan channel designated slot as indicated by the left dashed vertical line of FIG. 3, the sampling period of the scan channel can be completed in the minimum number of missed TDMA non-scan channel designated slots (shaded slots in C1). Thus, in the example shown, for a sampling period of 90 ms, only one TDMA non-scan channel designated slot is missed during the scan channel sampling period 330. If the sampling period had started later, it can be seen that the sampling period would have extended into a second TDMA non-scan channel slot thus increasing the size of the audio hole. Where the sampling or predetermined period is shorter, for example, slightly more than 65 ms, then there is greater tolerance for a later start. However, by avoiding starting or coinciding with the sampling of the scan channel within or during a TDMA non-scan channel designated slot, the number of these designated slots impacted by the scan is minimized.

In embodiments where scan channel activity can be determined from the presence (or absence) of a scan channel carrier signal, this may be performed in the duration of one off slot on the RF carrier signal of the TDMA non-scan channel. In this case, the scan channel sample period can be timed to coincide with the (for F2) or another (for other TDMA) slot not associated with the TDMA non-scan channel. Thus, the duration between switching to the RF carrier signal frequency of the scan channel and switching back to the RF carrier signal of the TDMA non-scan channel is less than the duration between two consecutive slots of the TDMA non-scan channel. In the case of F2, this is the duration of a single slot. By timing the start of this sampling period or switching to the RF carrier signal frequency of the scan channel to be at the end of a designated slot of the TDMA non-scan channel, no designated slots of the TDMA non-scan channel are missed. In the example of FIG. 3, this might correspond to sampling the scan channel during an unshaded off slot adjacent the shaded designated slot of the TDMA non-scan channel in carrier signal C1.

Figure 4:
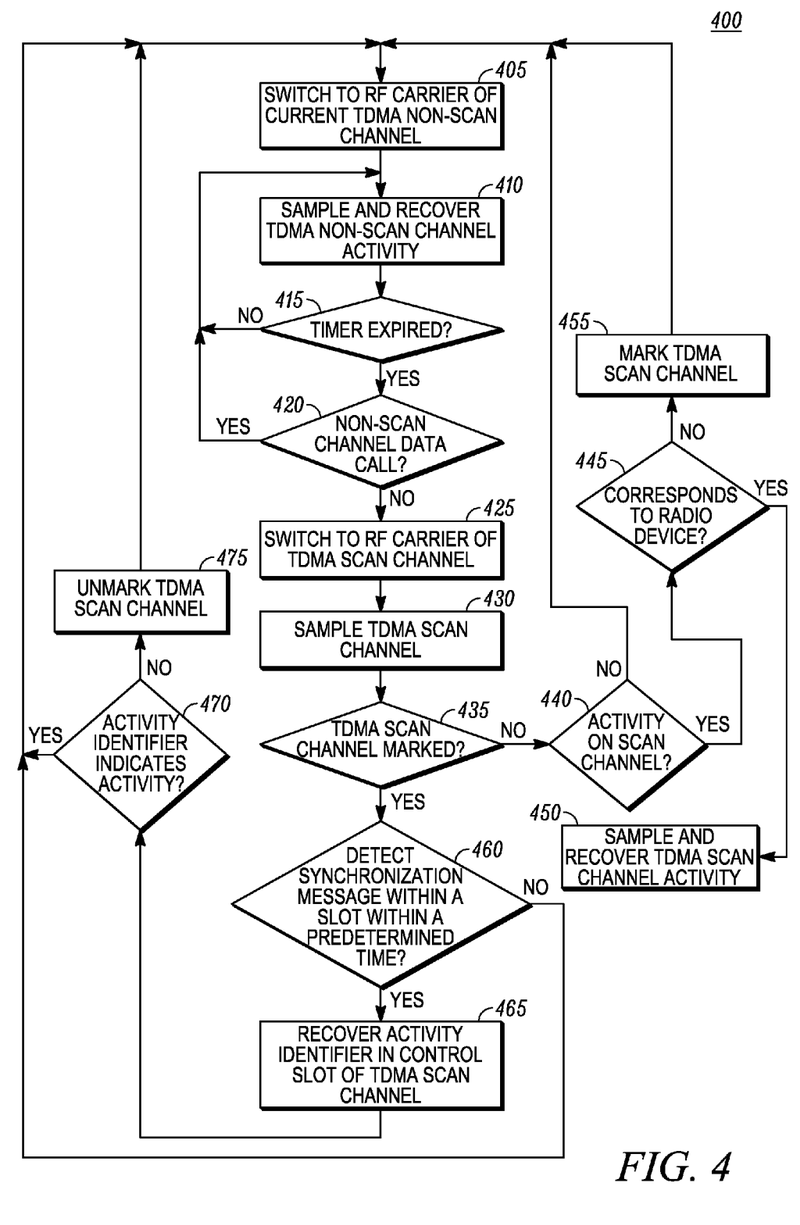
FIG. 4 is a flow chart illustrating a method of scanning a TDMA scan channel according to another embodiment of the present invention.

FIG. 4 is a flow chart for a scanning method of an embodiment in which the scan channel is a F2 TDMA repeater channel. The method 400 initially switches to the RF carrier signal (C1 in FIG. 3) of the active or current TDMA non-scan channel at step 405, and on which the radio device is receiving a voice or data call. The method continues to sample and recover non-scan channel activity on respective designated slots of the TDMA carrier signal (e.g., C1) at step 410. The method then determines whether a scan timer has expired at step 415. If the scan timer has not yet expired (415N), then the method returns to sample and recover the TDMA non-scan channel activity at step 410. If, however, the scan timer has expired (415Y), the method checks whether the TDMA non-scan channel activity is a data call at step 420, and if it is (420Y), the method returns to step 410. The embodiment is configured not to scan the scan channel during a data call as this will result in lost data which may be important to the application using the data call. By contrast in a voice call, the scanning procedure will result in an audio hole in the voice call, which may not be noticeable to a user, or may result in only a slight reduction in quality. If the non-scan channel activity is not a data call (420N), then the method switches to the RF carrier signal frequency of the TDMA scan channel (C2 in FIG. 3) at step 425. Referring to FIG. 3, this might be a switch from the C1 carrier signal to the C2 carrier signal with the non-scan (shaded in C1) and scan (unshaded in C2) channel designated slots as indicated.

The method then samples the TDMA scan channel at step 430. This involves sampling for a sample or predetermined period, for example, the 90 ms as shown. However, this sample period could be reduced to as little as slightly more than a single frame duration of 65 ms. A SYNC 325 is required to decode the CACH 320, and in the case where there is only one SYNC per frame (one call is voice in an F2 system), the sample may need to extend to the length of a frame (60 ms) plus the duration of a SYNC (5 ms)—hence a predetermined sample period of 65 ms. This would be sufficient to detect a SYNC in the worst case scenario where the sample is switched on a SYNC message, and hence, needs to wait until the end of the next SYNC is sampled before switching back to the TDMA non-scan channel. A sample period of longer than 90 ms will result in two non-scan channel designated slots being missed and hence a larger audio hole. In the F2 protocol, each 30 ms designated slot or burst carries 60 ms of compressed audio, and so missing a single designated slot 310 will result in a 60 ms audio hole, and missing two non-scan channel designated slots (two shaded slots on C1) will result in a 120 ms audio hole. Thus, the duration between switching to the RF carrier signal frequency (e.g., C2) of the TDMA scan channel and switching back to the RF carrier signal of the TDMA non-scan channel is less than the duration between three consecutive slots of the TDMA non-scan channel. In the case of F2, this is the duration of a single designated slot. By timing the start of this sampling period or switching to the RF carrier signal frequency of the TDMA scan channel to be at the end of a designated slot of the TDMA non-scan channel, only one designated slot of the TDMA non-scan channel is missed.

The method then determines if the TDMA scanned channel has been marked at step 435. If unmarked (435N), the method performs an inspection of activity on the TDMA scan channel at step 440, in order to determine whether there is any activity on the scan channel. Determining activity on a F2 TDMA scan channel can be implemented using the steps 460, 465, and 470 described in more detail below. If there is no activity (440N), the scan channel remains unmarked, and the method returns to switch to the carrier of the TDMA non-scan channel at step 405, and to recover this channel at step 410. If there is activity on the TDMA scan channel (440Y), the method determines whether or not this is addressed to the radio device at step 445. Determining activity 440 and whether or not the activity is of interest (addressed) to the radio device 445 typically involves a full qualification process which includes determining activity and address data in one process. If the activity (e.g., voice or data call) on the scan channel is not addressed to the radio device (445N), then the scanned channel is marked at step 455, and the method returns to step 405 where the radio device switches to the carrier of the TDMA non-scan channel. If, however, the scan channel activity is addressed to the radio device (445Y), the radio device remains on the RF carrier of the TDMA scan channel and continues sampling and recovering the TDMA scan channel for the user of the radio device at step 450.

If the scan channel was marked (435Y) at step 435, then the method determines whether there is activity on the TDMA scan channel by first determining whether a synchronization message has been detected within the sampled scan channel within a predetermined time at step 460. Referring again to FIG. 3, in a F2 system the synchronization message (SYNC) 325 of a repeater mode channel is embedded within the corresponding designated slot 315 when the scan channel is carrying a data call or is idle. When the scan channel is carrying a voice call, a SYNC message 325 is only embedded within every sixth designated slot 315. In the scan channel carrier signal C2 shown, the scan channel designated slot includes a SYNC 325 in every designated slot (unshaded), whereas the other channel within this carrier signal (C2) has a SYNC every sixth designated slot (shaded). Thus, the other channel (shaded) is carrying a voice call, whereas the scan channel (unshaded) is either carrying a data call or is idle. If a SYNC 325 is not detected within slightly more than a frame duration 310 of 65 msecs, then this means that both channels on the carrier signal (C2) are carrying voice calls. Thus, there is still activity on the scan channel and therefore the scan channel does not need to be unmarked. If a SYNC 325 is detected within slightly more than a frame duration 310 of 65 msecs (e.g., 66 ms), then this can be used to recover the CACH 320 associated with the scan channel designated slot 315 within the sample period 330.

In the method 400 of FIG. 4, if a synchronization message (SYNC 325) is not detected within the predetermined time of slightly more than a frame duration 310 of 65 msecs, then there is still voice activity on the scan channel and the method returns to step 405 where the radio device switches to the carrier of the TDMA non-scan channel. However, if a synchronization message (SYNC 325) is detected within the predetermined time (460Y), then the method recovers an activity identifier within the control slot (CACH 320) of the sampled TDMA scan channel at step 465. As noted above, in the F2 protocol the SYNC 325 can be used to recover the CACH 320, and hence the TACT bits. The SYNC 325 provides the necessary timing to know where in the carrier signal (C2) to find the CACH and hence TACT bits. The TACT bits include an Active bit which indicates whether the scan channel designated slot is active or idle. TACT bits also have another bit which indicates whether TDMA channel 1 or TDMA channel 2 is associated with this active bit. The method then determines whether the activity identifier indicates that there is activity on the scan channel at step 470. If there is still activity (470Y), for example, a data call, then the method returns to step 405 where the radio device switches to the carrier of the TDMA non-scan channel. However, if there is no activity on the scan channel (470N), the scan channel is idle, then the method unmarks the scan channel at step 475. This means that the next time the scan channel is scanned, the method will perform an inspection of any activity on the scan channel in order to re-mark the scan channel if this new activity is not addressed to the radio device, or to switch to receiving the scan channel if the new activity is addressed to the radio device. Following unmarking of the scan channel (475), the method returns to step 405 where the radio device switches to the carrier of the TDMA non-scan channel.

In some embodiments, a TDMA scan channel may be on the same RF carrier signal but on a different slot from the TDMA non-scan channel. In this case, the switch to the RF carrier signal of the scan channel involves switching to sample the designated slot of the scan channel on the same RF carrier signal. As the same SYNC will be present for the TDMA non-scan channel, the radio device can directly recover the activity identifier from the corresponding control slot.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of scanning a scan channel on a radio device during activity on a time division multiple access (TDMA) non-scan channel, the TDMA non-scan channel in a radio frequency (RF) carrier signal carrying periodic frames of a plurality of slots, the slots carrying respective TDMA channels, the method comprising:

switching from the TDMA non-scan channel to the RF carrier signal frequency of the scan channel;

in response to determining that the scan channel is unmarked performing an inspection of activity on the scan channel in order to determine whether activity on the scan channel is addressed to the radio device, and marking the scan channel when activity on the scan channel is not addressed to the radio device;

determining whether the scan channel is active in response to determining that the scan channel is marked;

unmarking the scan channel in response to determining that the scan channel is not active; and switching to the RF carrier signal of the TDMA non-scan channel;

wherein the timing of the switching between the RF carrier signal frequency of the scan channel and the RF carrier signal of the non-scan channel is dependent on the timing of the designated slots of the non-scan channel.

2. The method of scanning the scan channel as claimed in claim 1, wherein the switching to the RF carrier signal frequency of the scan channel and the switching to the RF carrier signal of the TDMA non-scan channel are arranged not to coincide with a said designated slot of the TDMA non-scan channel.

3. The method of scanning the scan channel as claimed in claim 2, wherein switching from the TDMA non-scan channel to the RF carrier signal frequency of the scan channel is performed at the end of a designated slot associated with the TDMA non-scan channel, and switching to the RF carrier signal of the TDMA non-scan channel is performed before the start of a subsequent said designated slot associated with the TDMA non-scan channel.

4. The method of scanning the scan channel as claimed in claim 1, wherein determining whether the scan channel is active comprises determining whether a carrier signal is present on the RF carrier signal frequency of the scan channel.

5. The method of scanning the scan channel as claimed in claim 4, wherein the duration between switching to the RF carrier signal frequency of the scan channel and switching to the RF carrier signal of the TDMA non-scan channel is less than the duration between two consecutive designated slots of the TDMA non-scan channel.

6. The method of scanning the scan channel as claimed in claim 1, wherein the scan channel is a TDMA scan channel and determining whether the scan channel is active comprises recovering an activity identifier in a control slot associated with the TDMA scan channel.

7. The method of scanning the scan channel as claimed in claim 6, wherein the duration between switching to the RF carrier signal frequency of the TDMA scan channel and switching to the RF carrier signal of the TDMA non-scan channel is less than the duration between three consecutive slots of the TDMA non-scan channel.

8. The method of scanning the scan channel as claimed in claim 6, wherein recovering an activity identifier in a control slot associated with the TDMA scan channel comprises detecting a synchronization message within a slot of the TDMA scan channel within a predetermined time.

9. The method of scanning the scan channel as claimed in claim 8, wherein the predetermined time for detecting a synchronization message is less than the duration between three consecutive slots of the TDMA non-scan channel.

10. The method of scanning the scan channel as claimed in claim 1, wherein the scan channel is a TDMA channel and performing an inspection of activity on the scan channel comprises determining from the designated slots associated with the TDMA scan channel whether the activity on the scan channel is addressed to the radio device.

11. A radio device comprising:

a receiver for receiving time division multiple access (TDMA) channels in respective radio frequency (RF) carrier signals carrying periodic frames of a plurality of slots, the slots carrying respective TDMA channels;

a processor arranged to switch the receiver from receiving a TDMA non-scan channel on a said RF carrier signal to a scan channel on a different RF carrier signal;

the processor arranged to perform an inspection of activity on the scan channel in order to determine whether activity on the scan channel is addressed to the radio device in response to determining that the scan channel is unmarked, and to mark the scan channel when activity on the scan channel is not addressed to the radio device;

the processor further arranged to determine whether the scan channel is active in response to determining that the scan channel is marked;

the processor further arranged to unmark the scan channel in response to determining that the scan channel is not active;

the processor arranged to then switch to the RF carrier signal of the TDMA non-scan channel;

wherein the processor is arranged to time the switches between the RF carrier signal frequency of the scan channel and the RF carrier signal of the non-scan channel to be dependent on the timing of the designated slots of the non-scan channel.

12. The radio device as claimed in claim 11, wherein the processor is further arranged to switch to the RF carrier signal frequency of the scan channel and to switch to the RF carrier signal of the TDMA non-scan channel so as not to coincide with a said designated slot of the TDMA non-scan channel.

13. The radio device as claimed in claim 12, wherein the processor is arranged to switch from the TDMA non-scan channel to the RF carrier signal frequency of the scan channel at the end of a designated slot associated with the TDMA non-scan channel, and to switch to the RF carrier signal of the TDMA non-scan channel before the start of a subsequent said designated slot associated with the TDMA non-scan channel.

14. The radio device as claimed in claim 11, wherein the processor is further arranged to recover activity identifier in a control slot associated with a TDMA scan channel in order to determine whether the TDMA scan channel is active.

15. The radio device as claimed in claim 10, wherein the duration between switching to the RF carrier signal of the scan channel and switching to the RF carrier signal of the TDMA non-scan channel is less than the duration between three consecutive slots of the TDMA non-scan channel.

* * * * *